(12) United States Patent
Wijting et al.

(10) Patent No.: US 9,480,051 B2
(45) Date of Patent: Oct. 25, 2016

(54) CARRIER AGGREGATION

(75) Inventors: Carl Simon Wijting, Espoo (FI); Mika Petri Olavi Rinne, Espoo (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 14/125,052

(22) PCT Filed: Jun. 10, 2011

(86) PCT No.: PCT/FI2011/050550
§ 371 (c)(1),
(2), (4) Date: Dec. 9, 2013

(87) PCT Pub. No.: WO2012/168535
PCT Pub. Date: Dec. 13, 2012

(65) Prior Publication Data
US 2014/0112282 A1    Apr. 24, 2014

(51) Int. Cl.
*H04W 4/00* (2009.01)
*H04W 72/04* (2009.01)
*H04L 5/00* (2006.01)
*H04W 72/00* (2009.01)

(52) U.S. Cl.
CPC .............. *H04W 72/04* (2013.01); *H04L 5/001* (2013.01); *H04L 5/0098* (2013.01); *H04W 72/00* (2013.01)

(58) Field of Classification Search
None
See application file for complete search history.

(56) References Cited

U.S. PATENT DOCUMENTS

| 8,477,721 | B2 * | 7/2013 | Ishizu | H04W 48/20 370/331 |
|---|---|---|---|---|
| 8,554,238 | B2 * | 10/2013 | Hwang et al. | 455/450 |
| 2010/0202393 | A1 | 8/2010 | Zhang et al. | |
| 2010/0226327 | A1 | 9/2010 | Zhang et al. | |
| 2010/0291912 | A1 * | 11/2010 | Tafarrodi | H04M 15/00 455/419 |
| 2011/0103243 | A1 | 5/2011 | Larsson et al. | |
| 2011/0267978 | A1 * | 11/2011 | Etemad | 370/254 |
| 2012/0324091 | A9 * | 12/2012 | Raleigh | H04L 41/0893 709/224 |

FOREIGN PATENT DOCUMENTS

| CA | 2750368 A1 | 7/2010 |
|---|---|---|
| CN | 101730164 A | 6/2010 |
| CN | 102026272 A | 4/2011 |
| EP | 2244411 A2 | 10/2010 |
| WO | WO-2010075822 A1 | 7/2010 |

OTHER PUBLICATIONS

Pedersen, et al., "Carrier aggregation for LTE-advanced: functionality and performance aspects", IEEE Communications Magazine vol. 49, No. 6, Jun. 2011.
Supplementary European Search Report dated Nov. 6, 2014, for European Patent Application No. 11867438.1.

* cited by examiner

*Primary Examiner* — Phirin Sam
(74) *Attorney, Agent, or Firm* — Mintz Levin Cohn Ferris Glovsky and Popeo, P.C.

(57) ABSTRACT

Information acquisition relating to a radio environment of a terminal is caused. A carrier aggregation configuration of the terminal is created on the basis of the acquired information, the carrier aggregation configuration comprising a plurality of aggregated cells of same relevance implemented by at least one base station. Information transmission relating to the carrier aggregation configuration is caused to at least one base station implementing at least one aggregated cell.

20 Claims, 10 Drawing Sheets

CARRIER AGGREGATION

RELATED APPLICATION

This application is a national stage application, filed under 35 U.S.C. §371, of PCT Application No. PCT/FI2011/050550, filed on Jun. 10, 2011, the contents of which are incorporated herein by reference in their entirety for all purposes.

FIELD

The invention relates to wireless communications, and, particularly, to carrier aggregation.

BACKGROUND

Carrier aggregation is a technique where a base station aggregates transmissions to a terminal on multiple carriers, possibly on adjacent carriers on the same frequency band, on non-adjacent carriers on the same frequency band, or on carriers on different frequency bands. Carrier aggregation is also a technique, where a terminal aggregates transmissions to a base station on multiple carriers, possibly on adjacent carriers on the same frequency band, on non-adjacent carriers on the same frequency band, or on carriers on different frequency bands. The aggregated transmissions may include single or multiple mutually different radio access technologies.

BRIEF DESCRIPTION

According to an aspect of the present invention, there is provided an apparatus as specified in claim 1.

According to another aspect of the present invention, there is provided another apparatus as specified in claim 9.

According to another aspect of the present invention, there is provided a method as specified in claim 16.

According to another aspect of the present invention, there is provided another apparatus as specified in claim 23.

According to another aspect of the present invention, there is provided a computer readable medium as specified in claim 24.

According to another aspect of the present invention, there is provided another method as specified in claim 25.

According to another aspect of the present invention, there is provided another apparatus as specified in claim 29.

According to another aspect of the present invention, there is provided another computer readable medium as specified in claim 30.

LIST OF DRAWINGS

Example embodiments of the present invention are described below, by way of example only, with reference to the accompanying drawings, in which FIGS. 1 and 2 illustrate example embodiments of apparatuses;

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
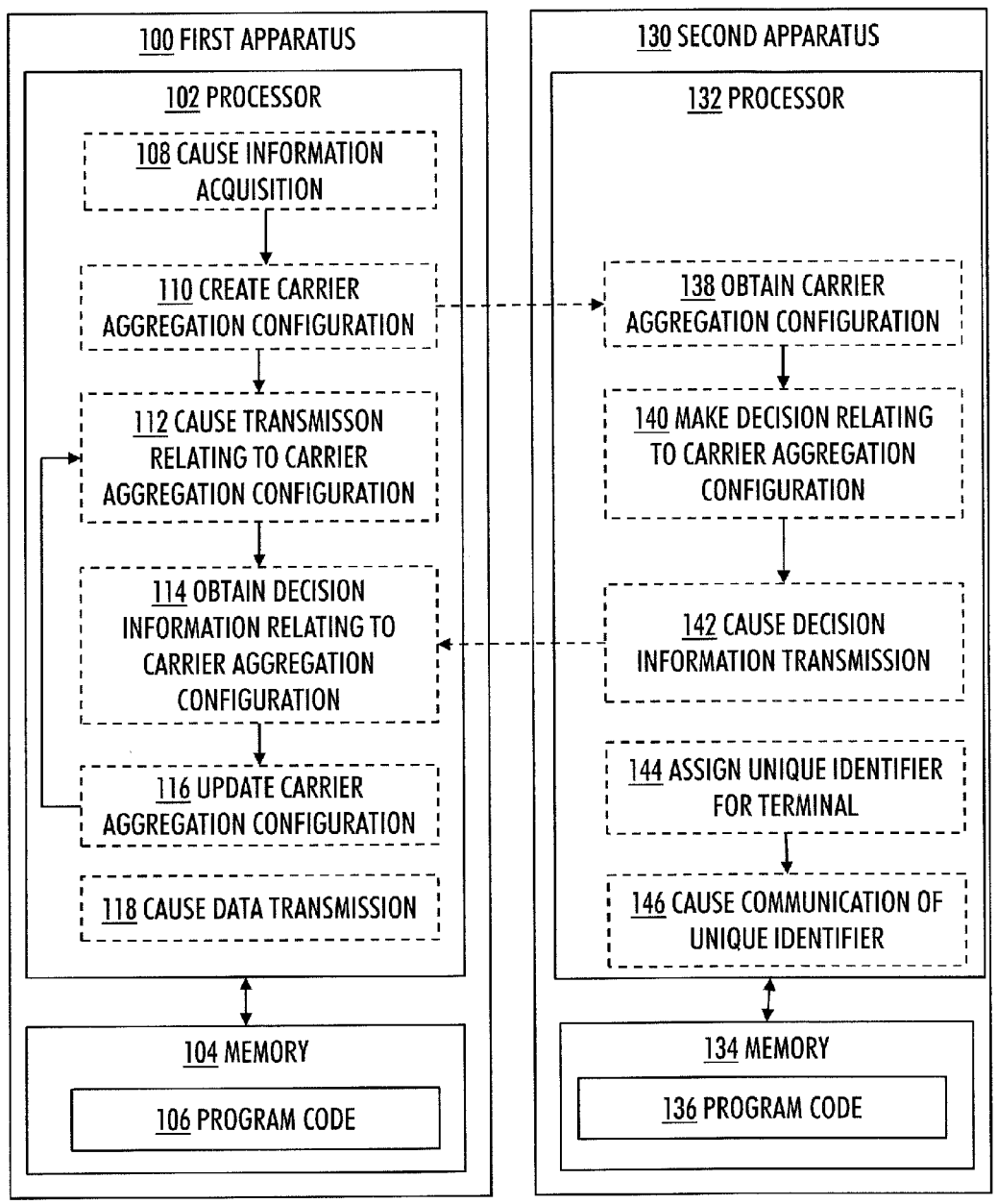
Figure 2:
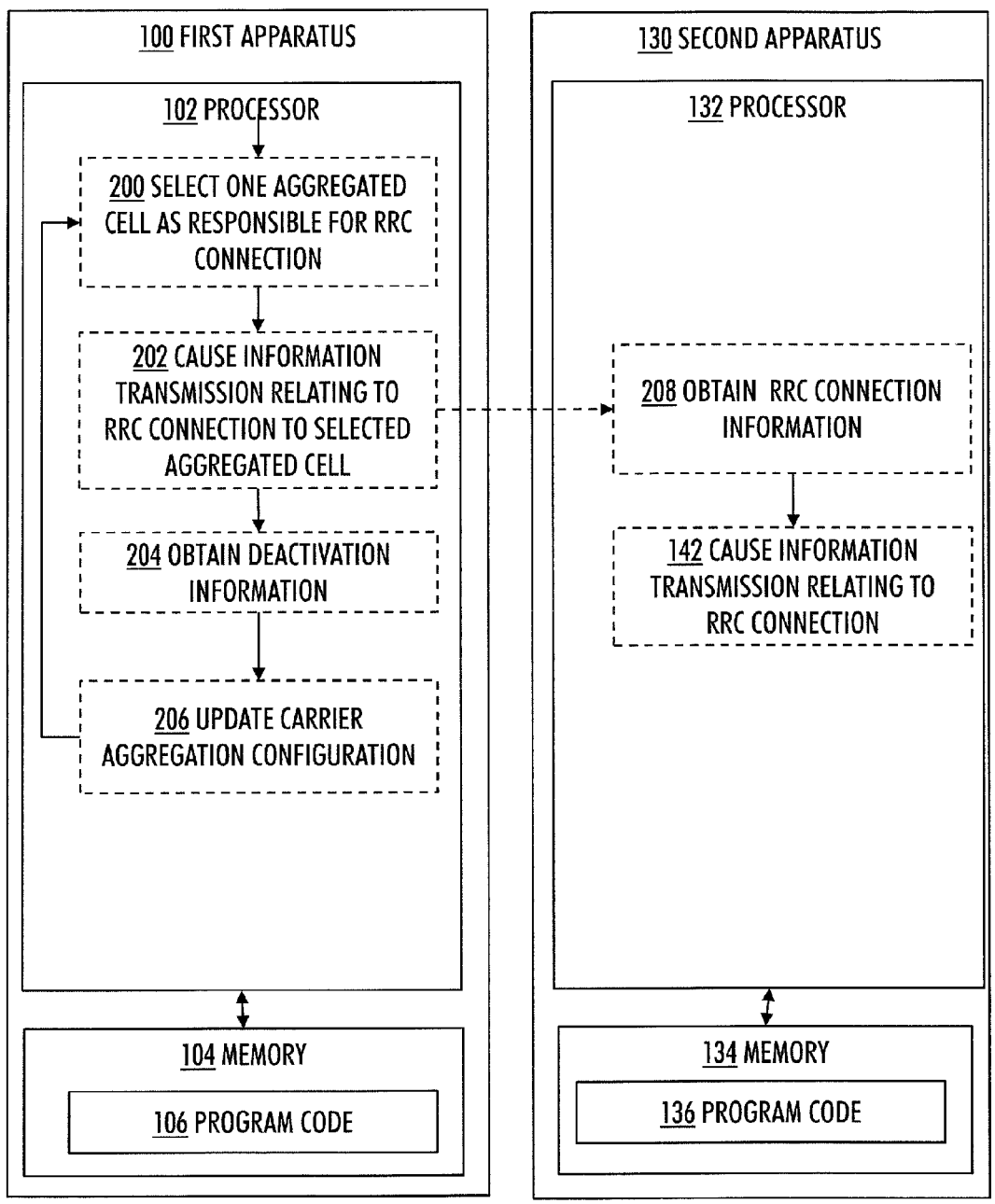

FIGS. 1 and 2 illustrate example embodiments of apparatuses 100, 130. FIGS. 1 and 2 only show some elements whose implementation may differ from what is shown. The connections shown in FIGS. 1 and 2 are logical connections; the actual physical connections may be different. Interfaces between the various elements may be implemented with suitable interface technologies, such as a message interface, a method interface, a sub-routine call interface, a block interface, a hardware interface, a software interface or any means enabling communication between functional sub-units. It should be appreciated that the apparatuses 100, 130 may comprise other parts. However, such other parts may be irrelevant to the described example embodiments and, therefore, they need not be discussed in more detail here. It is also to be noted that although some elements are depicted as separate ones, some of them may be integrated into a single physical element.

The first apparatus 100 comprises at least one processor 102, and at least one memory 104 including computer program code 106. The at least one memory 104 and the computer program code 106 are configured to, with the at least one processor 102, cause the apparatus 100 to perform at least the following: cause 108 information acquisition relating to a radio environment of a terminal; create 110 a carrier aggregation configuration of the terminal on the basis of the acquired information, the carrier aggregation configuration comprising a plurality of aggregated cells of same relevance implemented by at least one base station; and cause 112 information transmission relating to the carrier aggregation configuration to at least one base station implementing at least one aggregated cell.

The first apparatus 100 may be a terminal, e.g. user equipment (UE), a radio terminal, a subscriber terminal, smartphone, mobile station, mobile phone, portable computer, pad computer or some other type of wireless mobile communication device operating with or without a subscriber identification module (SIM). The terminal 100 may be a piece of equipment or a device that is configured to associate the terminal 100 and its user with a subscription and allows a user to interact with the radio system, e.g. the terminal 100 is capable of requesting service from the radio system. Similarly, the terminal 100 allows a user to interact with local area network (LAN), e.g. the terminal 100 is capable of requesting service from the LAN or via the LAN. The terminal 100 presents information to the user and allows the user to input information. In other words, the terminal 100 may be any terminal capable of wirelessly receiving information from and/or wirelessly transmitting information to the radio system, or LAN. Besides communication capabilities, the terminal 100 may include computer functionalities or functionalities of other data processing devices.

However, the first apparatus 100 may also be interpreted as a circuitry implementing the required functionality within the terminal. As was explained, the first apparatus 100 causes 108 the information acquisition, creates 110 the carrier aggregation configuration, and causes 112 the information transmission.

If the first apparatus 100 is the terminal, then it will also comprise the equipment needed for the communication, such equipment including at least one radio transceiver with all the required hardware and software. On the other hand, if the first apparatus 100 is the circuitry, then it will not necessarily comprise the radio transceiver(s) etc. but only interfaces enabling communication with such equipment implementing the communication with the base station, for example.

The second apparatus 130 comprises at least one processor 132, and at least one memory 134 including computer program code 136. The at least one memory 134 and the computer program code 136 are configured to, with the at least one processor 132, cause the apparatus 130 to perform at least the following: obtain 138 a carrier aggregation configuration of a terminal received by the base station from the terminal, wherein the carrier aggregation configuration is created by the terminal on the basis of radio environment information acquired by the terminal, and wherein the carrier aggregation configuration comprises a plurality of aggregated cells of same relevance implemented by at least one base station; make 140 a decision relating to the carrier aggregation configuration, and activate or deactivate an aggregated cell belonging to the carrier aggregation configuration as a result of the decision; and cause 142 decision information transmission to the terminal, wherein the decision information comprises information on whether the at least one base station activates or deactivates an aggregated cell belonging to the carrier aggregation configuration.

The second apparatus 130 may be a base station, e.g. a Node B, enhanced or evolved NodeB (eNB), a home eNode B (HeNB), an access point (AP), an IEEE 802.11 based access point, a femto node, a femto base station, or any other equipment belonging to the network infrastructure of the radio system, or wireless LAN and implementing the radio communication interface with the terminal. The base station may include networking functionality like Packet Data Convergence Protocol (PDCP), Ethernet, Digital Subscriber Lines (xDSL) or IP interfaces, gateway functionality, and Network Address Translator (NAT) for conversion between Internet Protocol (IP) addresses, for example. IP addresses may also form dual-stack implementations involving functionality with the IP version 4 (IPv4) and IP version 6 (IPv6). Proxy functionality may also be included.

However, the second apparatus 130 may also be interpreted as a circuitry implementing the required functionality within the base station. As was explained, the second apparatus 130 obtains 138 the carrier aggregation configuration, makes 140 the decision and causes 42 the decision information transmission.

If the second apparatus 130 is the base station, then it will also comprise the equipment needed for the communication such equipment including at least one radio transceiver with all the required hardware and software. On the other hand, if the second apparatus 130 is the circuitry, then it will not necessarily comprise the radio transceiver(s) etc. but only interfaces enabling communication with such equipment implementing the communication with the terminal, for example.

The same relevance of the aggregated cells implies that the radio resource control (RRC) protocol connection of the terminal 100 is to any base station 130, or to all base stations, among the plurality of active base stations belonging to the carrier aggregation configuration. The terminal 100 may in principle freely choose to which one of the base stations 130 it makes the RRC connection, for example. All base stations 130 and their cells in the carrier aggregation configuration need not be active all the time. Consequently, all those base stations 130 which are active in the carrier aggregation configuration may take care of radio resource control protocol connection. This further implies that the set of active base stations (cells) may change along time, but all of those which are active at a time carry the RRC connection, or, alternatively, one or more of those active base stations 130 are selected to carry the RRC connection. Therefore, the RRC connection may change the serving base stations momentarily.

Some example embodiments cover use in a macro cell cellular network, a cellular network having hierarchies of different cell sizes (macro, micro, pico, femto), heterogeneous networks, enterprise LAN, public hotspot networks, and home networks. Also, small enterprises, home offices and public houses may be covered by the example embodiments.

Consequently, the at least one memory 104 and the computer program code 106 of the first apparatus 100 may further be configured to, with the at least one processor 102, cause the first apparatus 100 to perform at least the following: select 200 one aggregated cell from the carrier aggregation configuration as responsible for the radio resource control protocol connection of the terminal 100, and cause 202 information transmission relating to radio resource control protocol connection of the terminal 100 to the selected responsible aggregated cell implemented by at least one base station 130. As was explained earlier, in an alternative example embodiment, the at least one memory 104 and the computer program code 106 of the first apparatus 100 may further be configured to, with the at least one processor 102, cause the first apparatus 100 to perform at least the following: select more than one aggregated cell or even all active cells from the carrier aggregation configuration as responsible for the radio resource control protocol connection of the terminal 100, and cause 202 information transmission relating to radio resource control protocol connection of the terminal 100 to the selected responsible aggregated cells implemented by at least one base station 130.

Accordingly, the at least one memory 134 and the computer program code 136 of the second apparatus 130 may further be configured to, with the at least one processor 132, cause the second apparatus 130 to perform at least the following: obtain 208 radio resource control protocol connection information received by the base station 130 from the terminal 100, and cause 142 information transmission relating to radio resource control protocol connection of the terminal 100 to other base stations 130 belonging to the carrier aggregation configuration (implementing the plurality of the aggregated cells).

Furthermore, the at least one memory 104 and the computer program code 106 of the first apparatus 100 may further be configured to, with the at least one processor 102, cause the first apparatus 100 to perform at least the following: obtain 204 deactivation information received by the terminal 100 from the base station 130 implementing the selected responsible aggregated cell, the deactivation information comprising information on that the base station 130 implementing the selected responsible aggregated cell deactivates the selected aggregated cell, update 206 the carrier aggregation configuration of the terminal on the basis of the acquired information, and the received deactivation formation, select 200 another aggregated cell from the carrier aggregation configuration as responsible for the radio resource control protocol connection of the terminal 100, and cause 202 information transmission relating to radio resource control protocol connection of the terminal 100 to the selected another responsible aggregated cell implemented by at least one base station 130. Note that activation and deactivation of cells in the carrier aggregation, does not need to change the carrier aggregation configuration. Carrier aggregation configuration may include potential carriers to initiate measurements, which support activation/deactivation of cells. However, leaving carriers out from the carrier aggregation configuration may save in measurements and measurement reports.

The carrier aggregation configuration itself may be defined based on measurements, or knowledge on radio frequency (RF) capabilities of the network, or it may be based on knowledge of the environment and constructions. A carrier aggregation configuration may include all base stations in a small office, or a whole building, all base stations on a floor of a building, all base stations in a given tower or wing of a building depending on the deployment in the premises, for example.

The radio system may be any standard/non-standard/proprietary system that supports the carrier aggregation. In the present, such a system is evolved universal terrestrial radio access (E-UTRA), also known as long term evolution (LTE) for example, or rather in their recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, personal communications services (PCS) and systems using ultra-wideband (UWB) technology.

Figure 5A:
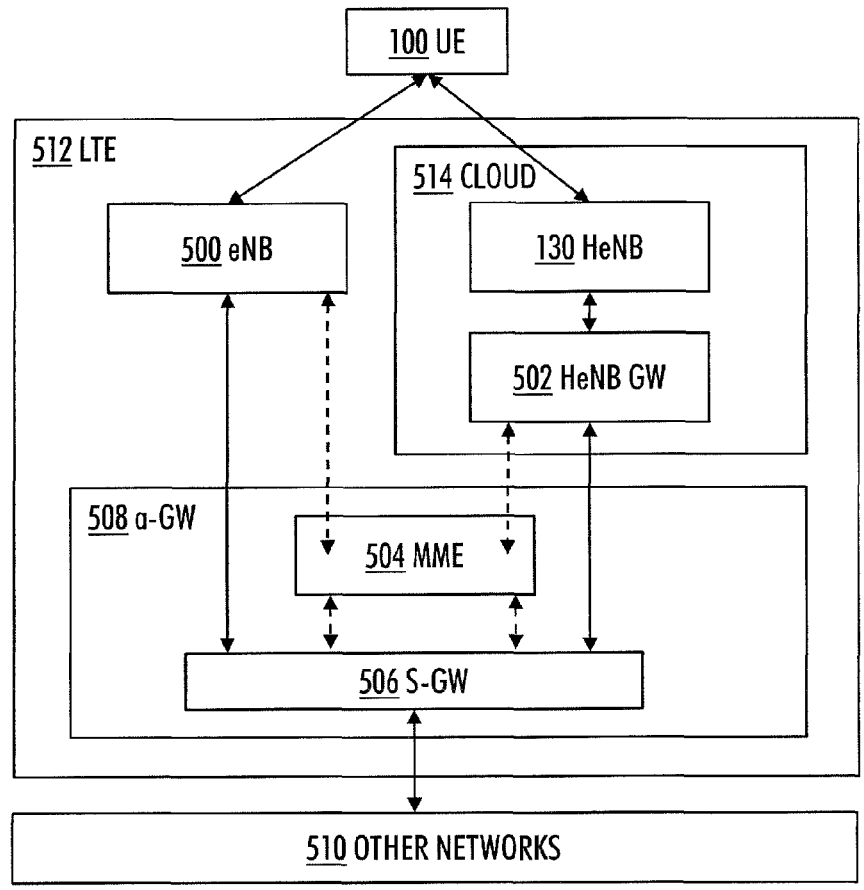
FIGS. 5A and 5B illustrate example embodiments of radio systems.
Figure 5B:
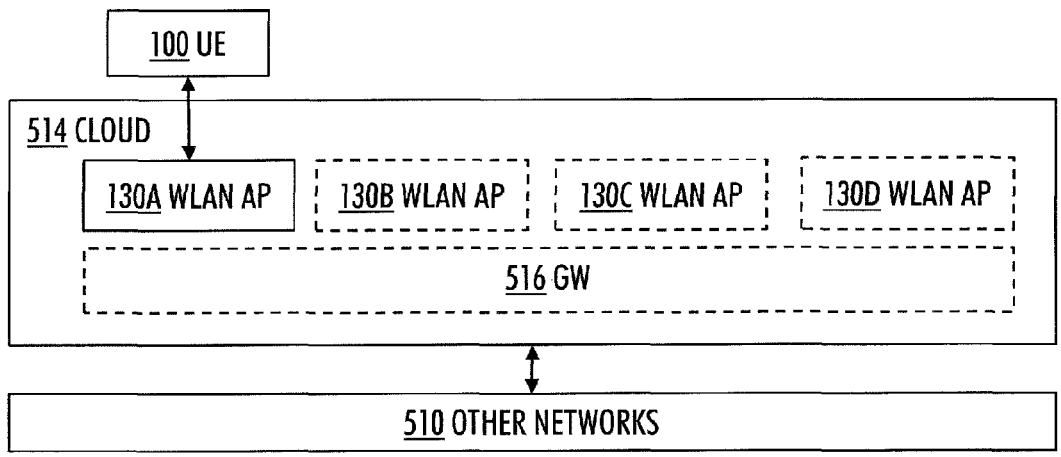

FIGS. 5A and 5B illustrate examples of radio systems, where FIG. 5A illustrates an example of the cellular radio system 512, Release 8 LTE, and FIG. 5B illustrates a wireless local area network, either in home or corporate environment. The three basic elements of the system 512 are UE 100 (=terminal), eNB 500 in a radio network and an access gateway (a-GW) 508 in a core network. Functionalities of the eNB 500 may include: all radio protocols, mobility management, all retransmissions, header compression, and packet data convergence protocols. The a-GW 508 provides the interface of the cellular radio system 512 to/from the other networks 510 such as the Internet. The a-GW 508 may be streamlined by separating the user and the control planes: a mobility management entity (MME) 504 is just a control plane entity and the user plane bypasses MME 504 directly to a serving gateway (S-GW) 506. In LAN architecture such split to control and user planes are not necessarily visible and all communications may happen over the Internet Protocol above the radio layers. IP, however, is capable of delivering Mobility Management, Session Management, Session Initiation Protocol (SIP)/Session Description Protocol (SDP) and Hypertext Transfer Protocol (HTTP) information between the source and destination addresses according to the needs of these higher layer protocols. Often these protocols execute between the client and the server, where the server may be a public or private source of information, or it may be a dedicated server of the operator (like Mobility Management Server), or it may be an assistance server like Self Organising Network (SON), Operation and Maintenance (O&M) or Access Network Discovery and Selection Function (ANDSF) server. The aforementioned protocols may also execute peer-to-peer protocols between network resources, for example Bit Torrent.

Furthermore, the cellular radio system 512 comprises a Home eNodeB (HeNB) 130 (=base station) that may also interface with the a-GW 508. Similarly the LAN may comprise an access point (WLAN AP) 130A, 130B, 130C, 130D that may interact in an Intranet, or may interface with a gateway 516. The LAN may also be a wireless network of its own. In a home environment there may be only one WLAN AP 130A, whereas in other environments such as a corporate environment there may be a number WLAN APs 130A, 130B, 130C, 130D belonging to the cloud 514. The HeNB 130 provides LTE radio coverage for the UE 100 by incorporating the capabilities of the eNB 500. As the flat architecture of the LTE 512 is not optimized for a very large number of HeNBs 130, a HeNB gateway 502 may be used to hide the large number of the HeNBs 130 from the a-GW 508.

The terminal 100 may communicate with the eNB 500, the HeNB 130, and WLAN AP 130A, 130B, 130C, 130D. In an example embodiment, it is envisaged that the HeNB 130 is the base station 130 implementing the carrier aggregation. In another example embodiment, it is envisaged that the WLAN AP 130A, 130B, 130C, 130D is the base station 130 implementing the carrier aggregation. The HeNB 130 may implement an LTE femtocell, e.g. a cell for use in a home or in a corporate environment such as an office building. The HeNB 130 may be installed in the same way as a WLAN access point 130A, 130B, 130C, 130D. The HeNB 130 may use operator's licensed frequency and it may be connected to the operator's core network. The transport connection between the HeNB(s) 130 and the a-GW 508 may be implemented with fixed Digital Subscriber Line (DSL) connections, or Ethernet network for the wired connection to the intranet/Internet. These transport network links may also comprise wireless links, like microwave links or WiMax links, that could be used for transport. Furthermore, as shown in FIGS. 5A and 5B, a cloud communication service 514 is used for communication between the HeNBs 130 and the HeNB GW 502, or between the WLAN APs 130A, 130B, 130C, 130D and the GW 516. The cloud 514 may be formed by an enterprise Ethernet LAN, for example.

Carrier aggregation expands the effective bandwidth utilized between the HeNB 130 and the UE 100 through concurrent utilization of radio resources across multiple carriers. Multiple component carriers (implemented by a base station 130 or by a number of base stations 130) are aggregated to form a larger overall transmission bandwidth. Two or more component carriers (each being 20 MHz, for example) can be aggregated to support wider transmission bandwidths up to 100 MHz or even more. Spectrum deployment may be either contiguous or non-contiguous. Instead of, or in addition to, the operator's licensed frequency, an unlicensed or license-exempt frequency band, e.g. the industrial, scientific, and medical (ISM) band may be used for the carrier aggregation. For example, the Federal Communications Commission (FCC) in the United States has issued a report and order which permits the use of TV white space (TV WS) spectrum. White space is the term used by the FCC for a TV spectrum which is not being occupied for primary usage e.g. by the TV or wireless microphone transmitters. The carriers may be under the control of a single operator, or not controlled by an operator at all, but by the enterprise IT, for example. The key point is using local spectrum efficiently: the spectrum of a single operator may be used, spectrum of multiple operators may be used if authorized (this sharing may happen according to flexible use of spectrum principles), or unlicensed or white spaces, or cognitive spectrum may be used.

Figure 3:
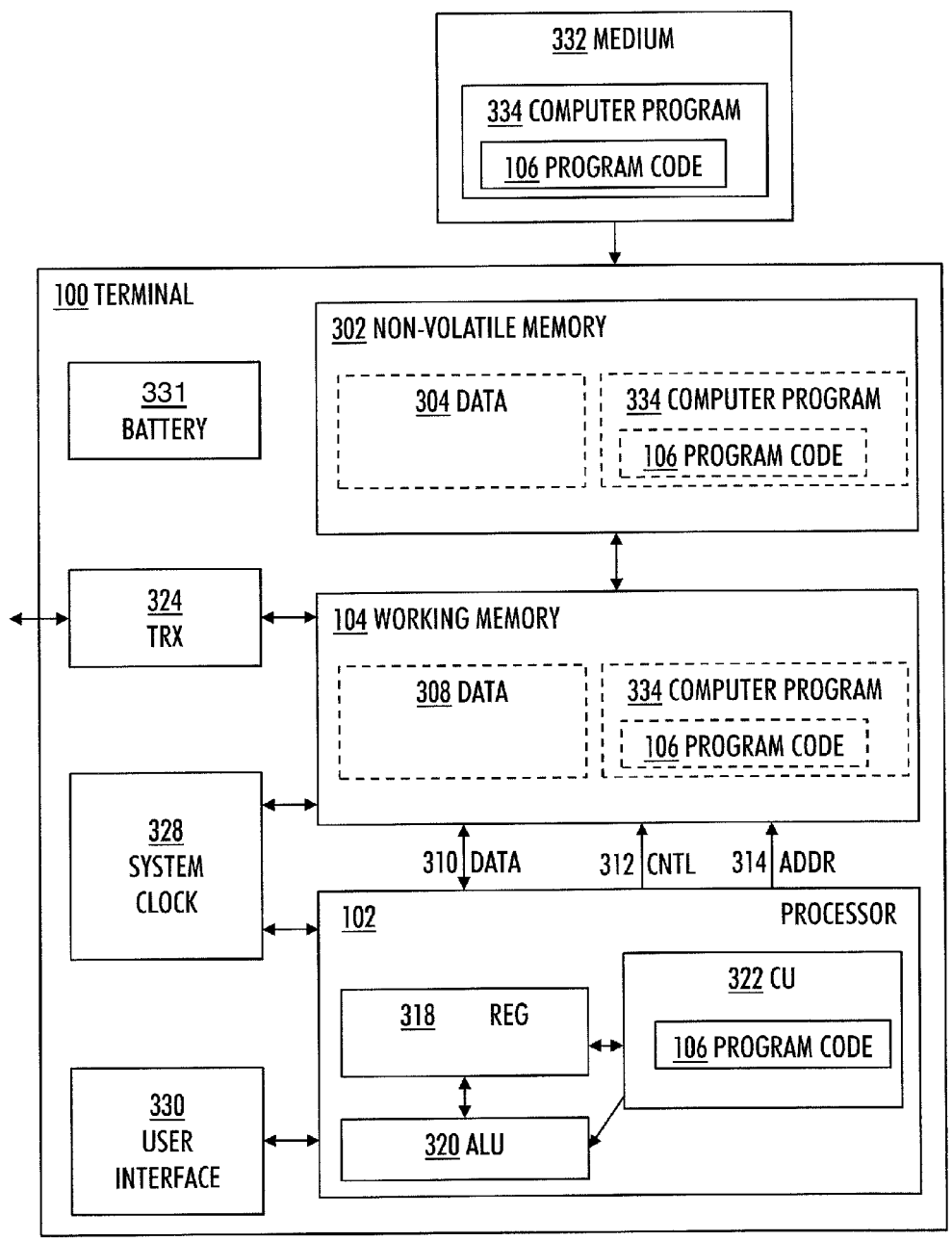
FIG. 3 illustrates an example embodiment of a terminal.

With reference to FIG. 3, let us study the structure of the terminal 100 in more detail. The terminal 100 may be implemented like an electronic digital computer, which may comprise, besides the processor 102 and the memory 104, a number of other parts. In addition to the working memory 104, a non-volatile memory 302 may be needed. Additionally, the terminal 100 may comprise a system clock 328. Furthermore, the terminal 100 may comprise a number of peripheral devices. In FIG. 3, three peripheral devices are illustrated: a battery 331, a transceiver 324, and a user interface 330. Naturally, the terminal 100 may comprise a number of other peripheral devices, not illustrated here for the sake of clarity.

The user interface 330 may comprise user interface circuitry (such as integrated circuits and devices such as touch-screen, keypad etc.) and user interface computer program code configured to facilitate user control of at least some functions of the terminal 100. The battery 331 may be an electrical battery including electrochemical cells that convert stored chemical energy into electrical energy.

The system clock 328 constantly generates a stream of electrical pulses, which cause the various transferring operations within the terminal 100 to take place in an orderly manner and with specific timing.

The transceiver 324 may implement a telecommunications connection between the terminal 100 and some other device. A wireless connection may be implemented with a wireless transceiver operating according to the earlier mentioned standards, such as the LTE, WLAN or any other suitable standard/non-standard wireless communication means. The transceiver 324 may comprise standard well-known components such as an amplifier, filter, frequency-converter, (de)modulator, encoder/decoder circuitries, and one or more antennas.

Additionally, the terminal 100 may communicate with other devices through its memory, e.g. the data 304 may have been brought into the non-volatile memory 302 via a memory device (such as a memory card, an optical disk, or any other suitable non-volatile memory device).

The term 'processor' 102 refers to a device that is capable of processing data. Depending on the processing power needed, the terminal 100 may comprise several (parallel) processors 102. The processor 102 may comprise an electronic circuitry. When designing the implementation, a person skilled in the art will consider the requirements set for the size and power consumption of the terminal 100, the necessary processing capacity, production costs, and production volumes, for example. The electronic circuitry of the processor 102 and the memory 104 may comprise one or more logic components, one or more standard integrated circuits, one or more application-specific integrated circuits (ASIC), one or more microprocessors, one or more processors with accompanying digital signal processors, one or more processors without accompanying digital signal processors, one or more special-purpose computer chips, one or more field-programmable gate arrays (FPGA), one or more controllers, hardware-only circuit implementations, such as implementations in only analogue and/or digital circuitry, combinations of circuits and software (and/or firmware), such as (as applicable): a combination of processor(s) or portions of processor(s)/software including digital signal processor(s), software, and memory(ies) that work together to cause an apparatus to perform various functions, circuits, such as a microprocessor(s) or a portion of a microprocessor(s), that require software or firmware for operation, even if the software or firmware is not physically present, and/or other suitable electronic structures. This definition of 'circuitry' applies to all uses of this term in this application. As a further example, as used in this application, the term "circuitry" would also cover an implementation of merely a processor (or multiple processors) 102 or portion of a processor 102 and its (or their) accompanying software and/or firmware. The term "circuitry" would also cover, for example and if applicable to the particular element, a baseband integrated circuit or applications processor integrated circuit for a user equipment.

The microprocessor 102 may implement functions of a central processing unit (CPU) on an integrated circuit. The CPU is a logic machine executing a computer program 334, which comprises computer program code 106. The program code 106 may be coded as a computer program using a programming language, which may be a high-level programming language, such as C, or Java, or a low-level programming language, such as a machine language, or an assembler. The program code 106 may also be hard-wired, e.g. if the processor 102 is implemented as an ASIC, the program code is implemented as blocks developed and implemented by appropriate ASIC development tools.

The CPU may comprise a set of registers 318, an arithmetic logic unit (ALU) 320, and a control unit (CU) 322. The control unit 322 is controlled by a sequence of program code 106 transferred to the CPU from the working memory 104. The control unit 322 may contain a number of microinstructions for basic operations. The implementation of the microinstructions may vary, depending on the CPU design. The processor 102 may also have an operating system (a general purpose operating system, a dedicated operating system of an embedded system, or a real-time operating system, for example), which may provide the computer program 334 with system services. Examples of operating systems include: MeeGo, Symbian, Android, iOS, RIM Blackberry OS, Windows Mobile, Linux, bada, Maemo etc.

There may be three different types of buses between the working memory 104 and the processor 102: a data bus 310, a control bus 312, and an address bus 314. The control unit 322 uses the control bus 312 to set the working memory 104 in two states, one for writing data into the working memory 104, and the other for reading data from the working memory 104. The control unit 322 uses the address bus 314 to send to the working memory 104 address signals for addressing specified portions of the memory 104 in writing and reading states. The data bus 310 is used to transfer data 308 from the working memory 104 to the processor 102 and from the processor 102 to the working memory 104, and to transfer the program code 106 from the working memory 104 to the processor 102.

The working memory 104 may be implemented as a random-access memory (RAM), where the information is lost after the power is switched off. The RAM is capable of returning any piece of data in a constant time, regardless of its physical location and whether or not it is related to the previous piece of data.

The non-volatile memory 302 retains the stored information even when not powered. Examples of non-volatile memory include read-only memory (ROM), flash memory, magnetic computer storage devices such as hard disk drives, and optical discs. As is shown in FIG. 3, the non-volatile memory 302 may store both data 304 and a computer program 334 comprising program code 106.

Figure 11:
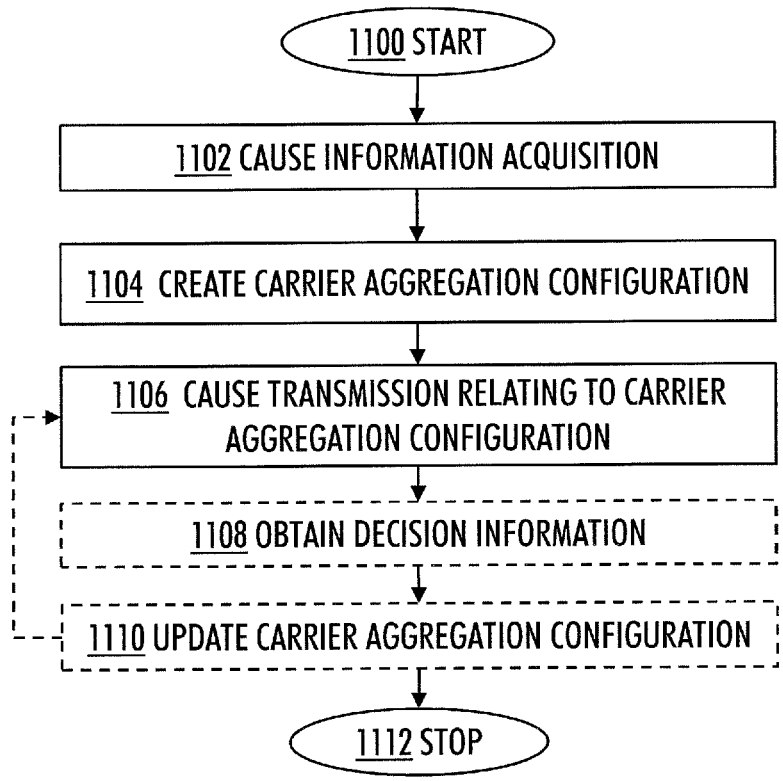
FIGS. 11 and 12 illustrate example embodiments of methods.

An example embodiment provides a computer-readable medium 332 comprising computer program code which, when loaded into the terminal 100, cause the apparatus to perform the required operations, illustrated as a method with reference to FIG. 11 later on. The computer-readable medium 332 may be a non-transitory computer readable storage medium storing the computer program 334 comprising program code 106. The computer program 334 may be in source code form, object code form, executable form or in some intermediate form. The computer-readable medium 332 may be any entity or device capable of carrying the program 334 to the terminal 100. The medium 332 may be implemented as follows, for example: the computer program 334 may be embodied on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the medium 332 may not be the telecommunications signal. The medium 332 may be a non-transitory computer-readable storage medium.

FIG. 3 illustrates that the medium 332 may be coupled with the terminal 100, whereupon the program 334 comprising the program code 106 is transferred into the non-volatile memory 302 of the terminal 100. The program 334 with its program code 106 may be loaded from the non-volatile memory 302 into the working memory 104. During running of the program 334, the program instructions 106 are transferred via the data bus 310 from the working memory 104 into the control unit 322, wherein usually a portion of the program code 106 resides and controls the operation of the terminal 100.

There are many ways to structure the program 334. The operations of the program may be divided into functional modules, sub-routines, methods, classes, objects, applets, macros, widgets, design blocks etc., depending on the software design methodology and the programming language used. In modern programming environments, there are software libraries, e.g. compilations of readymade functions, which may be utilized by the program for performing a wide variety of standard operations.

Figure 4:
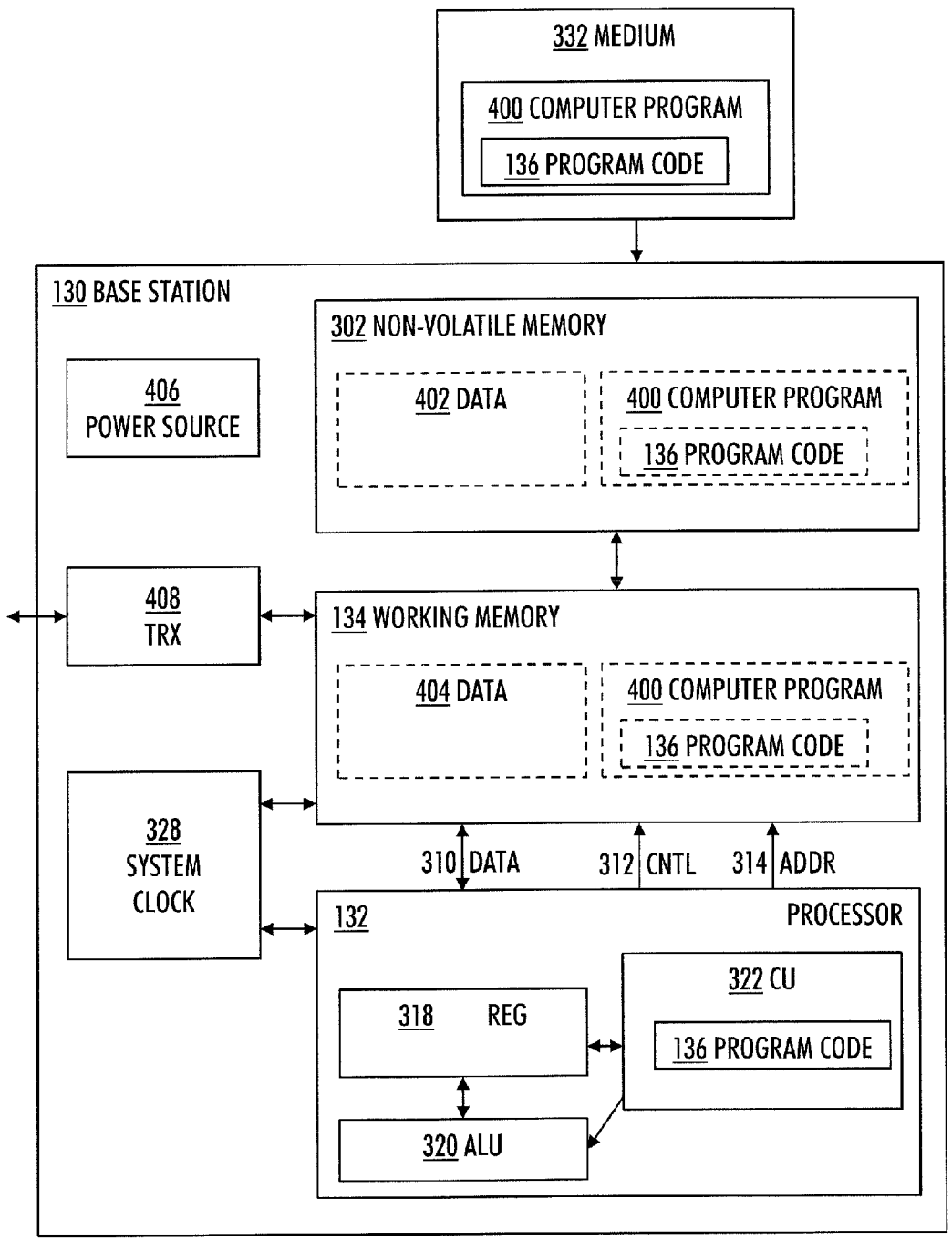
FIG. 4 illustrates an example embodiment of a base station.

With reference to FIG. 4, let us study the structure of the base station 130 in more detail. The base station 130 may be implemented like an electronic digital computer, which may comprise, besides the processor 132 and the memory 134, a number of other parts. Basically, the description of FIG. 4 resembles the description of FIG. 3, and, consequently, the following explanation will only note the differences. In FIG. 4, two peripheral devices are illustrated: a power source 406, and a transceiver TRX 408. Naturally, the base station 130 may comprise a number of other peripheral devices, not illustrated here for the sake of clarity.

The transceiver 408 may implement a telecommunications connection between the base station 130 and the terminal 100. A wireless connection may be implemented with a wireless transceiver operating according to the earlier mentioned standards, such as the LTE, or any other suitable standard/non-standard wireless communication means.

The power source 406 may be an independent power source, such as an electrical battery, a solar cell, or other means of generating energy, or it may be dependent from the outside world (of the base station 130), such as a power supply connected to a wall outlet (mains).

Data stored in the non-volatile memory 302 is now denoted with reference numeral 402, and data stored in the working memory 134 by reference numeral 404.

Figure 12:
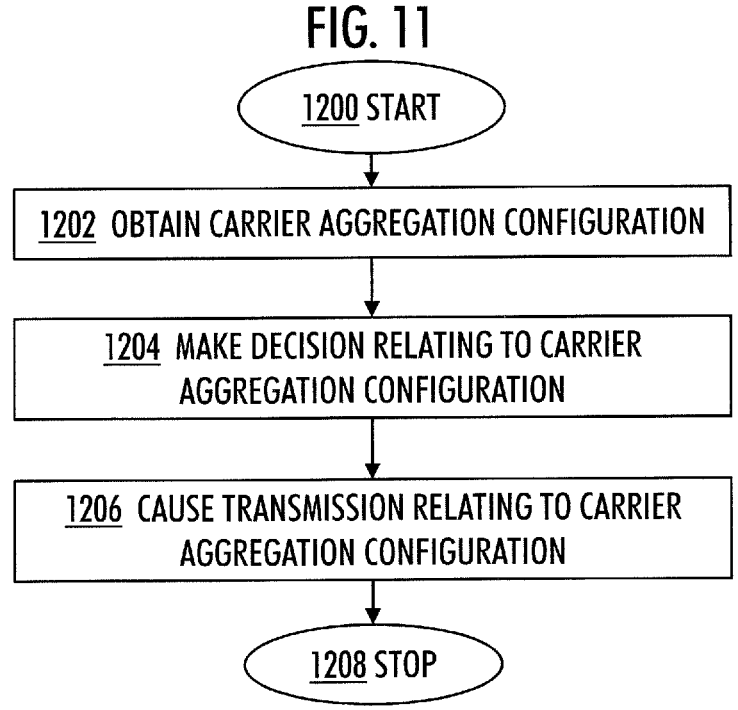

An example embodiment provides a computer-readable medium 332 comprising computer program code which, when loaded into the base station 130, cause the apparatus to perform the required operations, illustrated as a method with reference to FIG. 12 later on.

With reference to FIGS. 6, 7, 8, 9 and 10, let us next study an elaborate example embodiment of carrier aggregation configuration with the use of the cloud communication service 514.

Four base stations, BS1-BS4, 130A, 130B, 130C and 130D, and the GW 502/516 communicate through the cloud communication service 514. The UE 100 is within the first cell 602 formed by the first base station 130A and within the third cell 604 formed by the third base station 130C. The plurality of the base stations 130A, 130B, 130C, 130D belonging to the received carrier aggregation configuration form the cloud communication service 514 providing communication services on demand via a computer network coupling the base stations 130A, 130B, 130C, 130D belonging to the received carrier aggregation configuration.

The carrier aggregation may utilize cognitive radio, wherein the terminal 100 changes its transmission and/or reception parameters to communicate efficiently avoiding interference. The alteration of parameters may be based on spectrum sensing, including energy detection of received pilot signals from the base stations 130A, 130B, 130C, 130D in the terminal 100. The spectrum sensing operations may apply any mathematical sampling, filtering, averaging, windowing or weighting functions to create the actual measurement result. Besides the information acquisition by the measurements, also other means may be utilized. These other means include obtaining information from a local or global database (located in the Internet, or in some network element of the radio system, for example), from another terminals in the same area, or from a local coexistence manager, for example.

Besides creating the carrier aggregation configuration solely in the terminal 100, the creation may be more distributed in some example embodiments. The terminal 100 may report some information to the base station(s) 130 to form the carrier aggregation configuration. Alternatively, there may already exist a carrier aggregation configuration, and the terminal 100 proposes to modify that configuration. However, the base station 130 which receives this proposal/request may still define whether the configuration will be updated respectively or not. If the floor plan of a building defines the aggregation configurations, then base stations 130 may determine the initial carrier aggregation configuration. If the terminal 100 recognizes its position in the building or by measurements detect a base station 130, the definitions of that base station in the cloud 514 may directly imply whether the carrier aggregation configuration of the terminal 100 should be modified by the resources of that base station 130 or not.

The cognitive radio is showing a trend towards more flexibility in connectivity based on local conditions. Currently, cellular systems do not offer much differentiation for small cells from the point of view that could be provided based on the terminal's 100 own knowledge on local conditions. Operation in local conditions typically involves small cells and irregular, un-coordinated deployments, which means that there are multiple base stations, on multiple frequency layers that may be received by the mobile device 100. This learning is clear e.g. from Wi-Fi cells. The problem is that in these kinds of local deployments plenty of resources that are available actually remain unused. Another problem is that cell changes and discontinuous coverage causes interruptions in the connectivity. Often handovers are not executing well and cell changes become visible to the user as decreased service response. In the case, where handover is well executed, it causes significant signalling load and dynamics to the network.

Carrier aggregation in operator's licensed spectrum is specified in the 3GPP standard Release 10. In the scope of Release 10, no considerations on local spectrum availability like white spaces, license-exempt bands or other new (yet unlicensed) frequencies are considered.

In carrier aggregation, the base station 130 may aggregate transmissions on multiple carriers, possibly on adjacent carriers on the same band, on non-adjacent carriers on the same band or on carriers on different bands. In carrier aggregation, one of the carriers may be a primary cell (Pcell) a.k.a a primary carrier, and the other carriers may be secondary cells (Scell) a.k.a secondary carriers. All carriers, whose use may be aggregated for the UE 100, are present in that UE's carrier aggregation configuration. Any secondary carrier in the carrier aggregation configuration may be activated or deactivated by the network for the UE 100, based on measurement feedback of the UE 100. Carrier aggregation may be used in downlink or uplink, and their configurations, capabilities and use are independent. In prior art, radio resource control signalling is always present in the Pcell only. White space usage with WLAN is being designed in IEEE 802.11af, IEEE 802.19 and ETSI RRS.

Some example embodiments present a carrier aggregation scheme, where frequency resources are aggregated from multiple cells (Scell) 602, 604 in a cloud 514 to the terminal 100 so that all component carrier resources are considered of equal relevance. The activation/deactivation of each Scell 602, 604 may be handled independently of the other Scells. The radio resource control connection is established and maintained between the UE 100 and the cloud 514 via any of the Scells 602, 604. In effect, there is no Pcell.

In heterogeneous network (HetNet) deployments, the UE 100 may utilize resources from multiple base stations 130A, 130C (providing small cells) at the same time. These resources may be operated according to carrier aggregation mechanisms. If the frequency resources utilized from many cells are frequently changing, the primary serving cell may also change frequently. This imposes unnecessary dynamics to the cell changes by handover, unless all the cells in the carrier aggregation configuration are set to the same relevance. Therefore, some example embodiments consider all aggregated cells being secondary cells (Scells) 602, 604. The information conventionally delivered via Pcell is distributed to any of the Scells 602, 604. None of the Scells is taking a dominant role alone (and become a de facto Pcell), but that role is shared. Therefore, Scells are equal and may even be renamed as cloud cells (Ccell).

All secondary cells 602, 604 may be equally well activated and deactivated according to the measurement results. The impact of this frequent cell change is dramatic to the radio resource connection and to the IP connectivity in a conventional network architecture, where each network node (base stations 130A, 130B, 130C, 130D) has a connection (e.g. X2 or S1) to a further network element (such as GW 502/516). However, the network nodes, 130A, 130B, 130C, 130D are connected commonly to the cloud 514, which provides the termination of the radio resource connection, and which provides connectivity to the outer world (Internet) for the terminal 100 having radio links via one or more of any of the base stations 130A, 130B, 130C, 130D having an interface to the cloud 514. The base stations 130A, 130B, 130C, 130D may be assumed to connect to the cloud 514 via Ethernet, Internet, xDSL or other suitable protocols. The cloud 514 itself is a set of processing nodes, which offer computing and communication capabilities without addressing precisely, which node of the cloud 514 does what. The cloud 514 is an abstraction that is capable of adopting processing, storing and communication tasks, handle them efficiently and reliably and communicate to an outside interface (like an IP interface).

In this carrier aggregation scheme, all base stations 130A, 130B, 130C, 130D are in the same relevance level, and each one of them may activate and deactivate one or more cells 602, 604, or carriers. The terminal 100 will have connectivity to the cloud 514, as long as any one of the base stations 130A, 130B, 130C, 130D is capable of keeping at least one Scell 602, 604 active.

The cloud 514 will provide local connectivity among the base stations 130A, 130B, 130C, 130D and the GW 502/516, among the terminals 100 in the same cloud and possibly to media storages or servers inside the cloud 514. The cloud 514 may additionally take care of security and privacy. The cloud 514 may form an Ethernet subnet or an IP subnet, or an Intranet.

The carrier aggregation configuration is proposed to a base station 130A, 130B, 130C, 130D by the UE 100, and the UE 100 also maintains and stores the carrier aggregation configuration so that the carrier aggregation configuration stays consistent, when the serving base stations 130A, 130B, 130C, 130D of the cloud 514 change. Activation and deactivation of each Scell 602, 604 by each base station 130A, 130B, 130C, 130D is therefore self-sustained e.g. every base station 130A, 130B, 130C, 130D may make its own decisions based on the acquired information such as measurements and proposals by the UE 100. Each base station 130A, 130B, 130C, 130D signals its own carrier activation/deactivation messages independently of the other base stations to the UE 100.

There is no actual carrier aggregation configuration needed (just a local interpretation of it in the UE), but the UE 100 measures and proposes carrier aggregation updates to the base stations 130A, 130B, 130C, 130D. The base stations 130A, 130B, 130C, 130D respond by activating/deactivating Scells 602, 604. Once an Scell 602, 604 is active, the base station 130A, 130C creates transport blocks per each of its active cells. The splitting of the Internet flows to multiple base stations by the cloud 514 relies on cloud computing techniques. In cloud computing, the IP address of the client UE 100 may be uniquely understood inside the cloud 514. Additionally, each traffic flow may have a unique flow identity (FID). In uplink, UEs 100 themselves control how they split their uplink flows to the active Scell(s) 602, 604.

Figure 6:
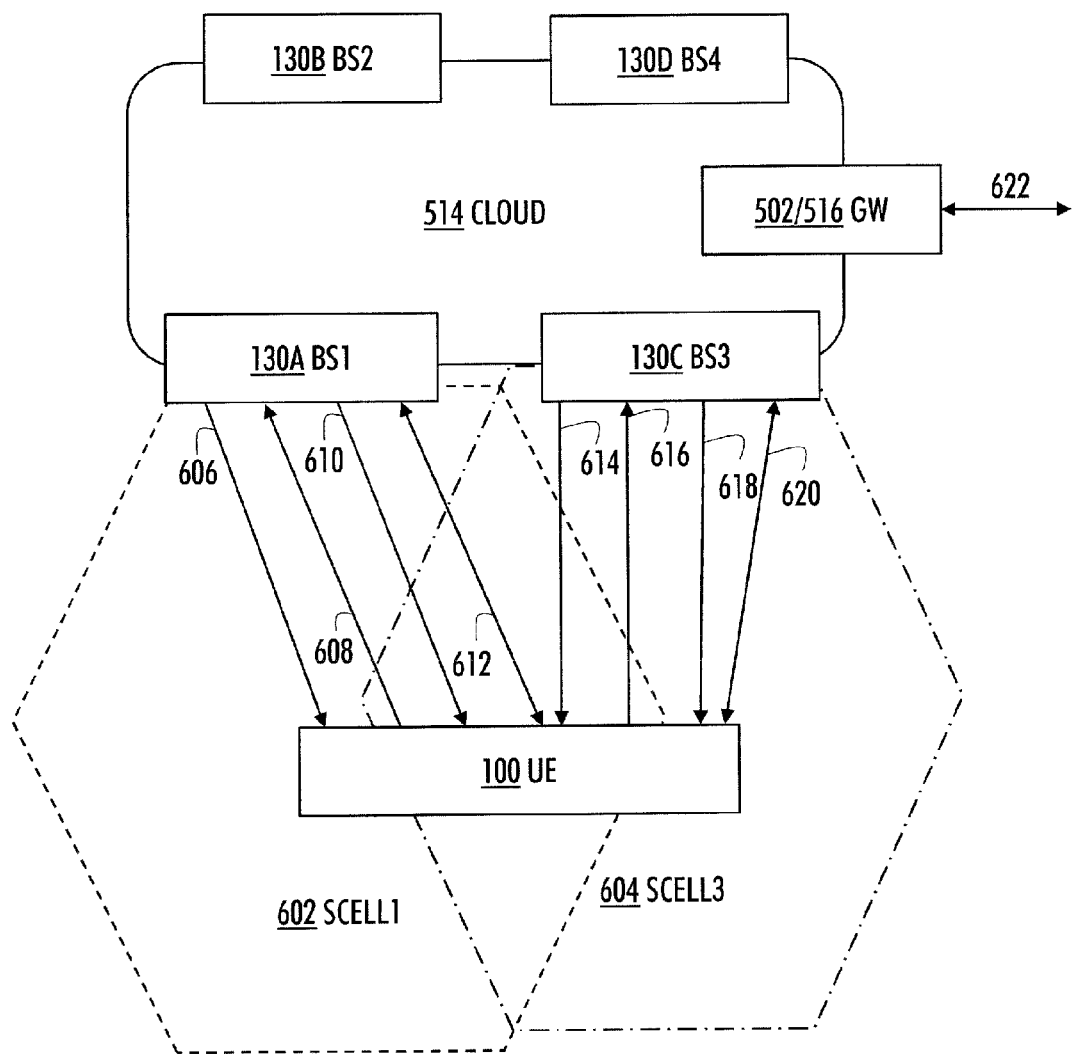
FIGS. 6, 7, 8, 9 and 10 illustrate example embodiments of carrier aggregation configuration with the use of a cloud communication service.

In FIG. 6, local connectivity via Scell(s) is described. The UE 100 measures 606, 614 the radio environment and proposes 608, 616 Scell connectivity based on the information it has. The base stations 130A, 130C activate/deactivate 610, 618 Scell(s) according to their own decisions based on the requests from the UEs. Finally, the UE 100 transmits 612, 620 payload data through the activated Scells to the base stations 130A, 130C, and the payload data may be transmitted 622 further on through the GW 502/516.

Figure 9:
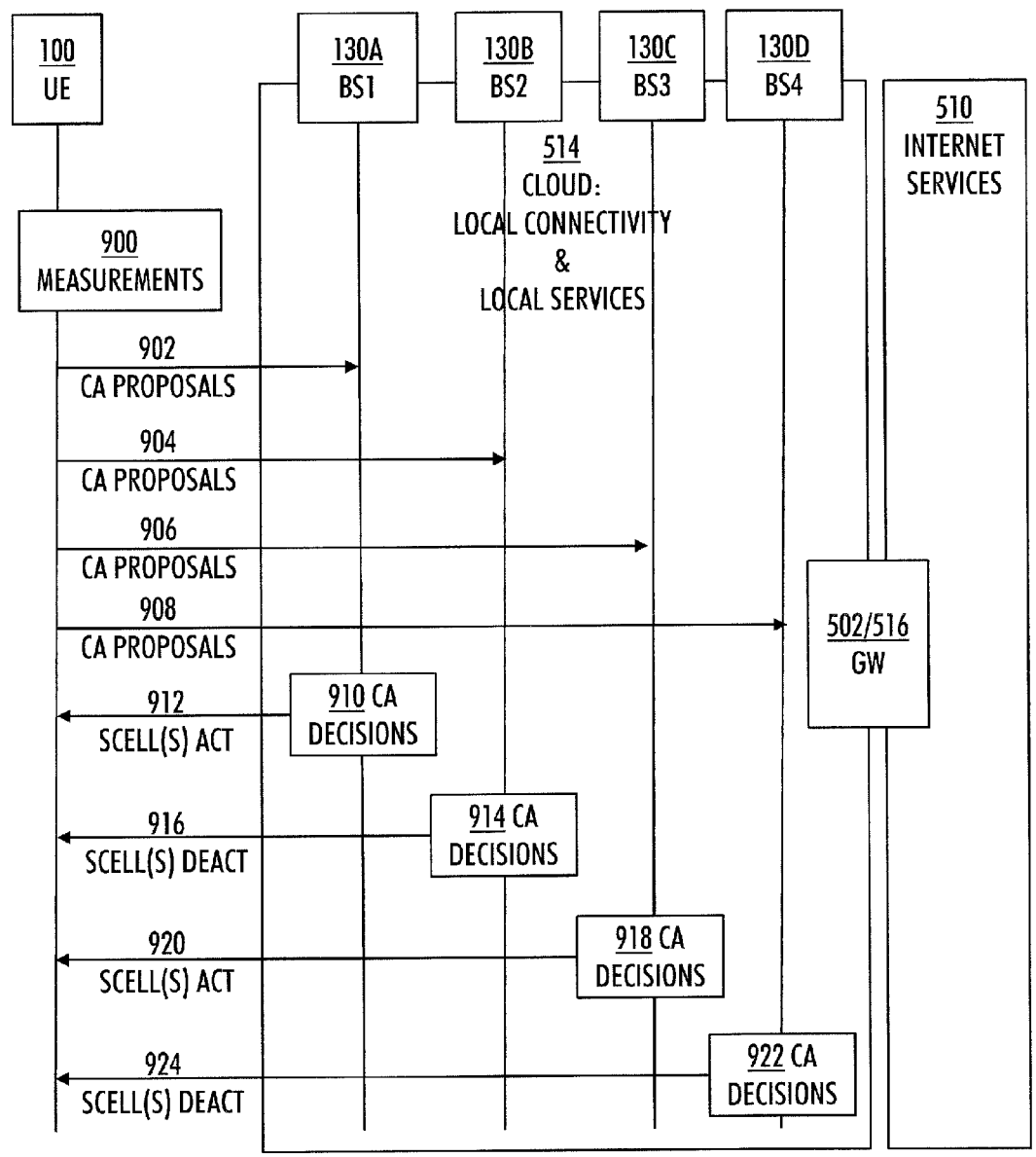

FIG. 9 illustrates an example embodiment of a signal sequence between the UE 100 and the base stations 130A, 130B, 130C, 130D in the cloud 514 implementing the carrier aggregation. The signalling messages are only exemplary and may even comprise several separate messages for transmitting the same information. In addition, the messages may also contain other information.

The UE 100 performs 900 the measurements of the base stations 130A, 130B, 130C, 130D. Consequently, the UE 100 proposes 902, 904, 906, 908 a carrier aggregation configuration including all four base stations 130A, 130B, 130C and 130D. Two of the base stations, 130A and 130C make 910, 918 positive decisions, and consequently transmit 912, 920 Scell activation messages to the UE 100. Two remaining base stations, 130B and 130D make 914, 922 negative decisions, and consequently transmit 916, 924 Scell deactivation messages to the UE 100.

Consequently, as shown in FIG. 1, the at least one memory 104 and the computer program code 106 of the first apparatus 100 may further be configured to, with the at least one processor 102, cause the first apparatus 100 to perform at least the following: obtain 114 decision information relating to the carrier aggregation configuration received by the terminal from the at least one base station implementing the at least one aggregated cell, the decision information comprising information on whether the at least one base station activates or deactivates an aggregated cell belonging to the carrier aggregation configuration, and update 116 the carrier aggregation configuration of the terminal on the basis of acquired information, and the received decision information.

In an example embodiment, the at least one memory 104 and the computer program code 106 of the first apparatus 100 may further be configured to, with the at least one processor 102, cause the first apparatus 100 to perform at least the following: obtain 114 a carrier activation message received by the terminal 100 from the at least one base station 130, and cause 118 data transmission from the terminal 100 to the at least one base station 130 through the aggregated cell of the base station 130 that transmitted the carrier activation message.

In another example embodiment, the at least one memory 104 and the computer program code 106 of the first apparatus 100 may further be configured to, with the at least one processor 102, cause the first apparatus 100 to perform at least the following: obtain 114 a carrier deactivation message received by the terminal 100 from the at least one base station 130, update 116 the carrier aggregation configuration of the terminal 100 on the basis of the acquired information, and the received carrier deactivation message, and cause 118 information transmission relating to the updated carrier aggregation configuration to at least one base 130 station implementing at least one aggregated cell.

As is shown in FIG. 9, the cloud 514 provides local connectivity and services, and the Internet services 510 are provided through the GW 502/516 of the cloud 514.

Some example embodiments describe carrier aggregation via the cloud 514. One may also do the aggregating at other levels. A generic format of the described aggregation is a set of base stations 130A, 130B, 130C, 130D forming the common cloud 514. UE(s) 100 may be connected to many of those base stations 130A, 130B, 130C, 130D simultaneously, based on the needs of the UE(s) 100 and based on the capacity of the base stations 130A, 130B, 130C, 130D to provide connectivity. The base stations 130A, 130B, 130C, 130D collectively serve the UE(s) 100. The UE 100 may also take the initiative to propose a base station to join the cloud 514.

The RRC connection is established and maintained between the UE 100 and the cloud 514. The RRC connection may be established and maintained via any of the carrier frequency resources, whether aggregated or not with any other resources. There is cloud-RNTI (Radio Network Temporary Identifier), "C"RNTI, for indexing the connection of a UE 100 to the cloud instead of the conventional cell-RNTI for indexing the connection of a UE to a cell.

When forming a cloud of femtos (or other suitably-sized cells), the base stations 130A, 130B, 130C, 130D first communicate with each other (e.g. over the X2 network or Ethernet) to form the cloud 514, e.g. they will form a network for sharing information, communications and load. In particular, in the cloud 514 the identity space may be commonly shared and understood by all base stations 130A, 130B, 130C, 130D in the cloud 514. Therefore, the "C"RNTI given by any of the base stations 130A, 130B, 130C, 130D to the UE 100 is understood uniquely by any other base station 130A, 130B, 130C, 130D of the cloud 514, as long as the RRC connection between the 100 UE and the cloud 514 is valid. The cloud (e.g. any base station in the cloud) 514 may initiate an RRC connection release procedure to remove the UE 100 from the cloud 514.

Accordingly, as shown in FIG. 1, the at least one memory 134 and the computer program code 136 of the second apparatus 130 may further be configured to, with the at least one processor 132, cause the second apparatus 130 to perform at least the following: assign 144 an identifier for the terminal 100 unique within the plurality of the base stations 130 belonging to the received carrier aggregation configuration, and cause 146 communication of the unique identifier of the terminal to the terminal 100 and/or to the plurality of the base stations 130 belonging to the received carrier aggregation configuration.

The cloud 514 handles mainly radio resources and connectivity but not mobility management as such. Mobility inside the cloud is self-sustained, because operations of the UE 100 inside the cloud 514 are not distinguished, as long as the UE 100 is connected to at least one of the base stations 130A, 130B, 130C, 130D. For a wider area mobility context, the UE 100 may have a connection to the MME 504 outside the cloud 514, or it may also be feasible to place the MME 504 inside the cloud 514, e.g. inside the same subnet with the base stations 130A, 130B, 130C, 130D.

Control information may also be delivered to the place where it is used, depending on the location of the UE 100 and the base stations 130A, 130B, 130C, 130D.

In addition to the UE's 100 connection to the cloud 514, the UE 100 may have a concurrent connectivity to the base station 500 of the wide area network according to any of the 3GPP legacy standards.

Figure 7:
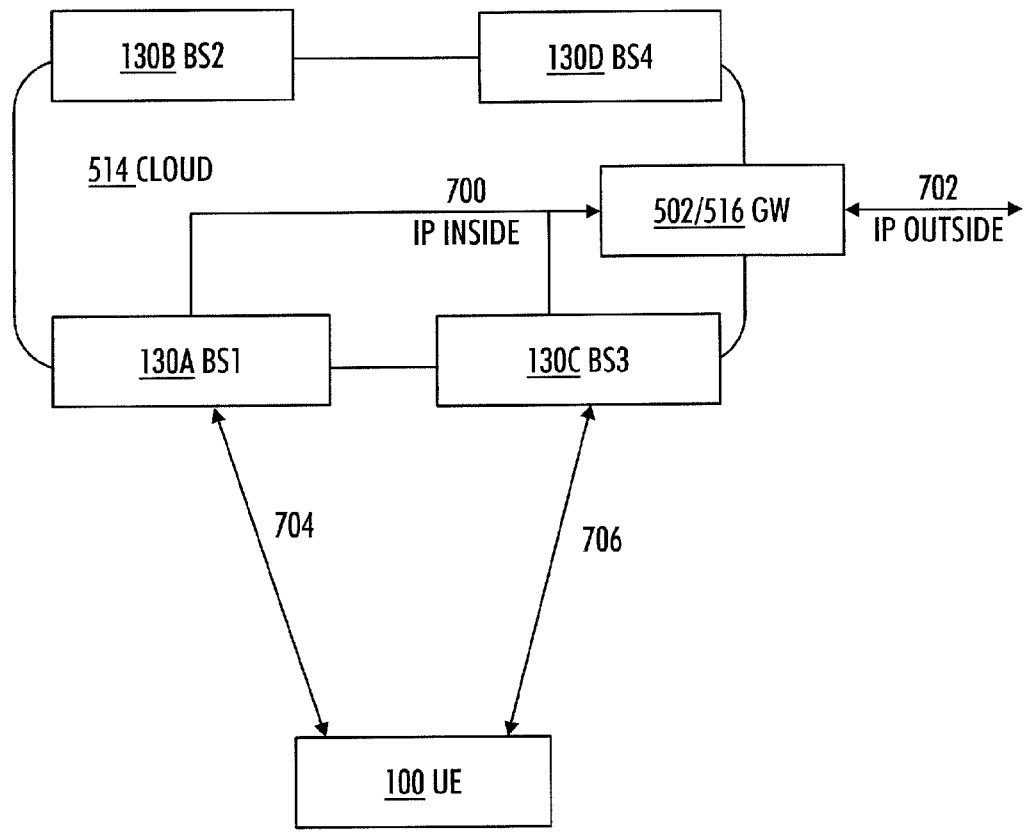

FIG. 7 illustrates an example embodiment of the carrier aggregation configuration. In FIG. 7, the UE 100 served by the cloud 514 formed by four base stations 130A, 130B, 130C, 130D. The UE 100 has Scell connectivity 704, 706 with the first base station 130A and the third base station 130C. The IP traffic 700 within the cloud 514 between the base stations 130A, 130C and the GW 502/516 is provided by the cloud 514, and the GW 502/516 provides the IP traffic 702 outside of the cloud 514, such as connectivity to the Internet.

Figure 8:
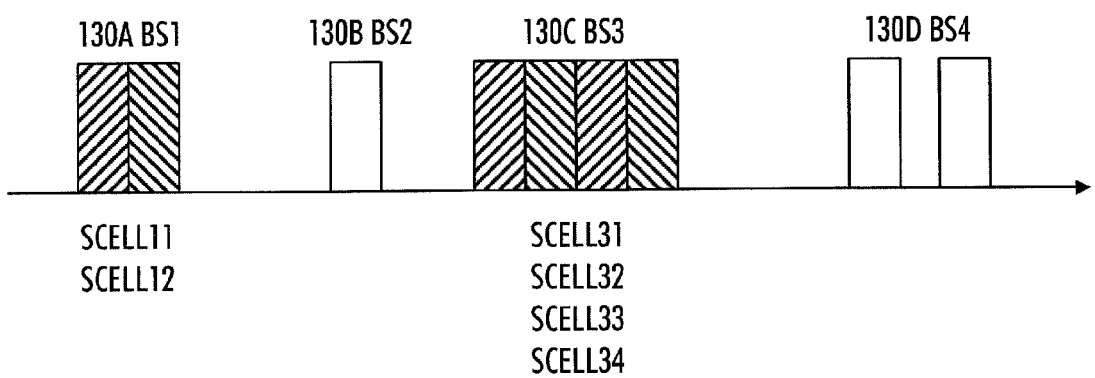

As shown in FIG. 8, an example embodiment of the resulting aggregation of frequencies includes two Scells, SCELL11 and SCELL12, with the first base station 130A and four Scells, SCELL31, SCELL32, SCELL33 and SCELL34 with the third base station 130C. The carrier aggregation configuration may include cell, each of which has a cell identity. All cells that are present in the carrier aggregation configuration are not necessarily provided by the same base station. Therefore, the carrier aggregation configuration may include list of cells with their cell identity expanded with the base station identity.

Downlink signals may be distributed at the GW 502/516 or one of the base stations 130A, 130C may take a role of a distributor. One base station may act as a distributor by forwarding Ethernet packets to further other base stations forming the cloud. Also an Ethernet switch may take the role of a distributor by forwarding the incoming packets to multiple base stations. This is may be implemented selectively so that an algorithm in a switch divides or selectively splits streams of packets to multiple destination base stations, the switch may also duplicate packet streams to multiple base stations, or the stream of packets may form an Ethernet broadcast transmission. Such a distributor may also act on IP protocol level in the router, where selective splitting, duplication or broadcasting of IP packet flows may happen. If one of the base stations 130A, 130C act as a distributor, this role may be assigned (handed over) to another base station if the previous base station becomes inactive or if the processing or communication load of a distributor becomes too heavy. Ethernet network algorithms can be updated to include such learning and switching algorithms to load the cloud network evenly, or avoiding bottleneck nodes. Similarly, IP algorithms in an IP routed network can learn to load the cloud network evenly, or avoiding congested bottleneck nodes. In case a base station acts as a distributor, there may be a split MAC (Medium Access Control) protocol between different base stations in the cloud 514. The split MAC may share the load of MAC protocol data units between the base stations reachable from the distributor. The MAC may act in the Ethernet, or it could act on the wireless protocol having to be encapsulated into the Ethernet transport from the distributor to the other serving base stations, and transmitted after removal of encapsulation as genuine MAC protocol data units from each of the base stations. This kind of split on wireless MAC protocol would have the benefit of being able to split packet flows, segment and concatenate protocol data units efficiently. The split may be between GW 502/516 and the base station, between base stations, or between an Ethernet switch, IP router or a cloud server.

Figure 10:
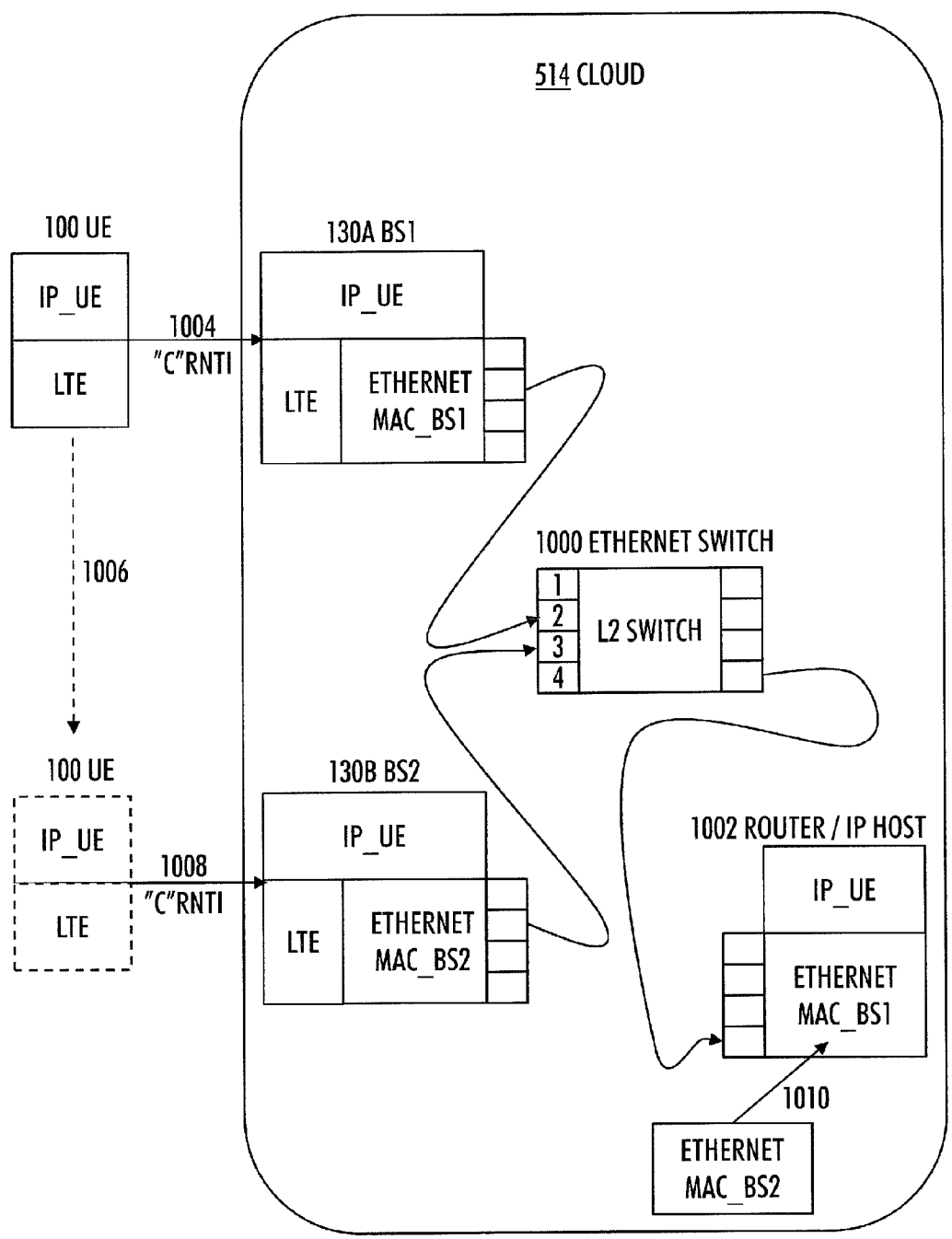

In the cloud 514, there may be one cloud controller, which instructs how and where to forward streams from the GW 502/516 and the base stations 130A, 130B, 130C, 130D. However, a more sophisticated cloud technique, in an Ethernet switched cloud, is to use Ethernet switching tables, as described in FIG. 10. FIG. 10 illustrates an example embodiment of the traffic routing within the cloud 514: connectivity inside the cloud while the terminal 100 moves 1006 from coverage of the first base station 130A to the coverage of the second base station 130B. There is no handover, but the mobility is arranged with the switching/routing update in the Ethernet/IP. Such a technique achieves the continuous connectivity inside the cloud 514 without a handover. In Ethernet switched cloud, the base station 130A which takes care of the radio connection will input data to the cloud 514 and hence the Ethernet switching tables of an Ethernet switch 1000 will automatically become updated by that new Ethernet_MAC address of the base station 130A to be used also for the incoming/outgoing traffic. Similarly, IP routing tables are available if the cloud 514 is an IP network. The radio conditions determine, which base stations 130A, 130B are currently serving, and the IP address of those base stations 130A, 130B becomes updated to the routing tables at a router/IP host 1002 for the IP routing of traffic to the IP destination address of the UE 100. In FIG. 10, the Ethernet_MAC address of the first base station 130A in the routing table of the router/IP host 1002 is replaced 1010 by the Ethernet_MAC address of the second base station 130B. In some cases, also Internet control protocols may apply for the control of routing table updates. As shown in FIG. 10, the "C"RNTI 1004, 1008 remains the same even if the base station changes from the first base station 130A to the second base station 130B. As the UE 100 has a single identity in the cloud 514, the UE 100 may connect via the base stations 130A, 130B to the network without S1 nor X2 tunneling, and, consequently, tight coordination may not be needed between the base stations 130A, 130B.

In FIG. 10, IP_UE is the IP address of the UE 100. The UE 100 may get an IP address from its serving or PDN gateway, or it may request an IP address by executing DHCP protocol, which is capable of reaching a DHCP server that can grant IP addresses. In some example embodiments, the UE 100 may also get an IP address from the IP configuration of the serving base station/access point 130. The cloud 514 may include a DHCP server that is capable of allocating IP addresses that are valid inside the cloud. The gateway may take care of masking the cloud subnet addresses from the Internet, and, vice versa, routing the Internet traffic reaching the gateway 502/516 inside the cloud 514, by the cloud subnet addresses, or by switching the Ethernet traffic to the correct ports to reach the serving base station 130 or the gateway 502/516.

In FIG. 10, ETHERNET MAC_BS1 means the Ethernet MAC address of the first base station 130A. The Ethernet MAC address of the base station 130A is used in Ethernet switching to deliver UE originated packets from its serving base station to the next node in the Ethernet that can route packets forward towards their destinations. Vice versa, the Ethernet MAC address of the base station 130A is used in Ethernet switching to deliver the packets from the network targeted to the UE 100 first to the serving base station 130A.

In FIG. 10, LTE is the radio access technology used in the wireless access of the cloud 514. The base station 130A may have LTE/LTE-A technology. Similarly, 3G/HSPA radio access technologies may be used. Also WiFi technology may be used for the radio access of the cloud 514. However, these radio access technologies are only examples, and the example embodiments are not limited to these technologies only, but any suitable technology capable of supporting carrier aggregation may be used.

For example, the "radio handover" may be based on the principle that MAC ids are shared between the base stations 130A, 130B and base stations' path switching does not happen according to tunneling or such 3GPP protocols but by updating the Ethernet switching tables (and maybe also IP routing tables) according to the IETF protocols. Ethernet switching and IP routing may be extremely fast and efficient due to their learning (copying) algorithms and automatic table updates. Therefore, in some example embodiments, no tunnel negotiation protocols need to be involved in transport layer switching. If a secured tunnel like Transport Layer Security (TLS) is applied, it may act on top of the local switching/routing network between the terminal and the server. If a secured tunnel is established to an intermediate gateway, also that may act on top of the local switching/routing network. These tunneling solutions do not compromise the efficiency of the local cloud network as such, but some tunneling protocol overhead will appear of course.

Some described example embodiments may bring forth an efficient aggregation of different carriers locally based on local needs of the UEs 100: the best knowledge on local connectivity and spectral conditions may be available locally by the UE 100 and to the local base stations 130A, 130B, 130C, 130D, and the described carrier aggregation scheme may provide good mobility, coverage and/or capacity within the area of the cloud 514.

The cloud RAN in wide area architecture uses new (S1-like) interfaces to deliver soft bits/hard bits or protocol data units over defined interfaces to the cloud 514 for computing and connection to the operator's evolved packet core. This cloud architecture does not necessarily have architecture of a LAN. Cloud RAN is based on well-defined proprietary or standardized interfaces, where the user plane application part and framing protocols take care of the transport from the base stations 130A, 130B, 130C, 130D to the cloud computing units, like a server hall. This architecture does not use commodity Ethernet or freely-routable internet protocols. Cloud RAN may use Ethernet and Internet Protocols as transport layers for the dedicated framing protocol and interfaces. However, they are not freely routable, and end point tunneling is used instead. This means that in the cloud RAN, tunneling protocols are used between the base stations 130A, 130B, 130C, 130D and the cloud 514. In the cloud architecture, base stations 130A, 130B, 130C, 130D have a radio stack (at least PHY and MAC), which allows distributed computing (at or) above MAC. The data split may happen at the IP layer. However, some example embodiments use a clouded MAC, in the sense that MACs of the base stations 130A, 130B, 130C, 130D share a common space of identities. This MAC architecture may also take care of aggregations in the cloud e.g. using radio resources of several base stations 130A, 130B, 130C, 130D. The data flows are split to the base stations in the IP layer, however Ethernet MAC may do majority of the actual execution here. The Ethernet MAC address of the serving base station(s) appear in the L2 Ethernet switching table. However, in the cloud there may appear a router above the Ethernet switched network, so that routing to the current subnet happens at the IP layer and switching in the subnet happens at the Ethernet MAC layer. The RRC protocol may be shared to the base stations 130A, 130B, 130C, 130D or to the cloud 514, because there is a central repository for sharing the identities. In a nutshell, radio operation without Pcells is combined with the cloud networking 514. This utilizes Ethernet/IP switching (without tunneling) in the cloud 514, single RRC identity over the radio to the cloud, central or shared repository of user space in the cloud area and single node scheduling decisions. The complexity of getting all information to the scheduling nodes would be there in a tunneled architecture. This complexity vanishes, because the cloud operates by Ethernet switching and IP. There is no special flow control in Ethernet/IP, and nobody experiences Ethernet LAN particularly slow. On the contrary, Ethernet switching is very fast, because it is based on algorithms learning directly from the flow of packets and updating the table entries in a switching table. The management of flows may be assisted in the gateway 502/516 at the edge (in/out) of the cloud by using flow identity (FID). In this example embodiment, the edge node checks the FID and decides the destination(s) based on that. This way flows may be distributed in a way increasing efficiency and yet keeping each flow coherent.

Another property of the cloud 514 is that the base stations 130A, 130B, 130C, 130D may have a shared identity space. This may be implemented e.g. by a central memory repository (or registry), which includes the served UEs 100 and their identities in the cloud 514. Now, at every RRC connection related action, the base station 130A, 130B, 130C, 130D may visit the repository and check what the agreed identities for that UE 100 are in the cloud 514. Normal shared memory principles may be applied for taking care of data integrity and security of the repository. By these means each serving base station 130A, 130B, 130C, 130D may be set to equal relevance (e.g. act as a Scell and act on behalf of the Pcell).

In uplink communications from the UE 100 to the cloud 514, the activated Scells may use fully non-overlapping resources. The UE 100 may have an uplink Scell1 to the first base station 130A that will use frequencies in band F1, whereas the uplink Scell3 to the third base station 130C will use frequencies in band F3. In this case, the UE 100 creates Transport Blocks from the packets of its served traffic flow(s). The Transport Blocks transmitted by the UE 100 to the first base station 130A and the third base station 130C will form a cumulative, aggregated sum, of received packets of the served flow(s) in the cloud 514. This example embodiment of aggregation scheme may have the benefits that frequency resources between neighbouring base stations in the cloud 514 may use at least partially non-overlapping frequencies (partial re-use), which may reduce interference in the cloud footprint, for example. If neighbouring base stations have partial overlap of frequency resources, the cloud 514 may apply coordinated multipoint transmission schemes to reduce interference inside the cloud 514.

In an example embodiment, the UE 100 may report to the base station 130A, 130B, 130C, 130D additional information to arrange transmissions according to a coordinated manner, along a Coordinated multipoint transmission (CoMP) scheme, for example. In the CoMP scheme, the base stations 130A, 130B, 130C, 130D may transmit to multiple terminals 100 in a manner minimizing their mutual interference. This may be done by scheduling decisions or by pre-coding simultaneous transmissions to reduce interference spatially, or to make interference spatially structured so that it is possible to cancel the strongest dominant interferers in the receiver. Among these techniques, also multi-user MIMO, single-user MIMO, rank adaptation, beam forming and such techniques may be applied among the more advanced selection of precoding matrixes from the multi-point coordinating codebooks. The receiver algorithms may consist of multi antenna reception with interference rejection and interference cancellation techniques. However, scheduling of frequency resources, e.g. using the component carriers (their activation and deactivation) in a proper manner per base station 130A, 130B, 130C, 130D per mobile device 100, may already be very efficient for interference management inside the cloud 514.

One example embodiment extends the use of carrier aggregation to device-to-device (terminal-to-terminal) communications (D2D). D2D may be self-sustained or coordinated by the fixed base stations. In both of these forms, the cloud 514 architecture is applied. For the self-sustained device to device communications, the terminals 100 will setup a cloud 514, and the devices 100 will mutually agree on carriers to aggregate for each of the D2D links. Some D2D links in an ad hoc network may use more aggregated component carriers to boost the throughput, contrary to other links, which may have to rely on a minimum carrier to be used, just to maintain the device-to-device connection.

The carrier aggregation configuration for device-to-device links is locally stored in the device(s) 100, and activation/deactivation of each component carrier is negotiated between the devices 100. If either one of the devices 100 proposes activation of a component carrier (present in the carrier aggregation configuration), and the other device 100 accepts, the carrier becomes activated. Vice versa, if either one of the devices 100 indicates deactivation of a component carrier, that component carrier becomes deactivated.

In the cloud controlled device-to-device communications, the base stations 130A, 130B, 130C, 130D in the cloud 514 may mutually agree on the best use of aggregated resources for D2D, and each base station will control the devices in its coverage range according to the principles agreed inside the cloud 514 with the other base stations. In this way, devices 100 in the cloud area will get consistent information about the resource aggregations in use (in particular, aggregations in use for the D2D).

The UE 100 may make decisions on proposing Scells based on all the information it has (stored) and may acquire—not only based on its measurements on the environment. The UE 100 may get information from the cloud 514 network on the initiative of the UE or the network. The UE 100 may also get information from other UEs or other base stations 130A, 130B, 130C, 130D or from network management servers.

Next, an example embodiment of a method will be described with reference to FIG. 11. The method may be performed in the apparatus 100. The method may be implemented as the apparatus 100 or the computer program 334 comprising program code 106 which, when loaded into the apparatus 100, cause the apparatus 100 to perform the process to be described. The example embodiments of the apparatus 100 may also be used to enhance the method, and, correspondingly, the example embodiments of the method may be used to enhance the apparatus 100. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required in the method, except where necessary due to the logical requirements for the processing order.

The method starts in 1100. In 1102, information acquisition relating to a radio environment of a terminal is caused. In 1104, a carrier aggregation configuration of the terminal is created on the basis of the acquired information. The carrier aggregation configuration comprises a plurality of aggregated cells of same relevance implemented by at least one base station. In 1106, information transmission relating to the carrier aggregation configuration is caused to at least one base station implementing at least one aggregated cell. The method ends in 1112.

Optionally, in 1108, decision information relating to the carrier aggregation configuration received by the terminal from the at least one base station implementing the at least one aggregated cell is obtained. The decision information comprises information on whether the at least one base station activates or deactivates an aggregated cell belonging to the carrier aggregation configuration. Optionally, in 1110, the carrier aggregation configuration of the terminal is updated on the basis of the acquired information, and the received decision information. As shown in FIG. 11, the method may operate in a looped fashion: after the operation 1110, the operation 1106 may be entered again.

In an example embodiment, a carrier activation message received by the terminal from the at least one base station is obtained, and data transmission from the terminal to the at least one base station is caused through the aggregated cell of the base station that transmitted the carrier activation message.

In an example embodiment, a carrier deactivation message received by the terminal from the at least one base station is obtained. The carrier aggregation configuration of the terminal is also updated on the basis of the acquired information, and the received carrier deactivation message. Additionally, information transmission relating to the updated carrier aggregation configuration is caused to at least one base station implementing at least one aggregated cell.

In an example embodiment, one aggregated cell from the carrier aggregation configuration is selected as responsible for the radio resource control protocol connection of the terminal, and information transmission relating to radio resource control protocol connection of the terminal is caused to the selected responsible aggregated cell implemented by at least one base station.

In an example embodiment, deactivation information received by the terminal from the base station implementing the selected responsible aggregated cell is obtained. The deactivation information comprises information on that the base station implementing the selected responsible aggregated cell deactivates the selected aggregated cell. The carrier aggregation configuration of the terminal is also updated on the basis of the acquired information, and the received deactivation formation. Additionally, another aggregated cell from the carrier aggregation configuration is selected as responsible for the radio resource control protocol connection of the terminal. Information transmission relating to radio resource control protocol connection of the terminal is caused to the selected another responsible aggregated cell implemented by at least one base station.

Next, an example embodiment of a method will be described with reference to FIG. 12. The method may be performed in the apparatus 130. The method may be implemented as the apparatus 130 or the computer program 400 comprising program code 136 which, when loaded into the apparatus 130, cause the apparatus 130 to perform the process to be described. The example embodiments of the apparatus 130 may also be used to enhance the method, and, correspondingly, the example embodiments of the method may be used to enhance the apparatus 130. The operations are not in strict chronological order, and some of the operations may be performed simultaneously or in an order differing from the given one. Other functions may also be executed between the operations or within the operations and other data exchanged between the operations. Some of the operations or part of the operations may also be left out or replaced by a corresponding operation or part of the operation. It should be noted that no special order of operations is required in the method, except where necessary due to the logical requirements for the processing order.

The method starts in 1200. In 1202, a carrier aggregation configuration of a terminal received by the base station from the terminal is obtained, wherein the carrier aggregation configuration is created by the terminal on the basis of radio environment information acquired by the terminal, and wherein the carrier aggregation configuration comprises a plurality of aggregated cells of same relevance implemented by at least one base station. In 1204, a decision relating to the carrier aggregation configuration is made, and an aggregated cell belonging to the carrier aggregation configuration is activated or deactivated as a result of the decision. In 1206, decision information transmission to the terminal is caused, wherein the decision information comprises information on whether the at least one base station activates or deactivates an aggregated cell belonging to the carrier aggregation configuration. The method ends in 1208.

In an example embodiment, radio resource control protocol connection information received by the base station from the terminal is obtained, and information transmission relating to radio resource control protocol connection of the terminal is caused to other base stations belonging to the carrier aggregation configuration.

In an example embodiment, an identifier for the terminal unique within the plurality of the base stations belonging to the received carrier aggregation configuration is assigned, and communication of the unique identifier of the terminal is caused to the terminal and/or to the plurality of the base stations belonging to the received carrier aggregation configuration.

The present invention is applicable to cellular radio systems defined above but also to other suitable telecommunication systems. The protocols used, the specifications of cellular radio systems, their network elements, and subscriber terminals develop rapidly. Such development may require extra changes to the described example embodiments. Therefore, all words and expressions should be interpreted broadly and they are intended to illustrate, not to restrict, the example embodiments. It will be obvious to a person skilled in the art that, as technology advances, the inventive concept can be implemented in various ways. The invention and its example embodiments are not limited to the examples described above but may vary within the scope of the claims.

The invention claimed is:

1. An apparatus comprising:
at least one processor; and
at least one memory including computer program code;
the at least one memory and the computer program code are configured to, with the at least one processor, cause the apparatus to perform at least the following:
cause information acquisition relating to a radio environment of the apparatus;
create a carrier aggregation configuration on the basis of the acquired information, the carrier aggregation configuration comprising a plurality of aggregated cells of same relevance implemented by at least one base station, wherein the plurality of aggregated cells form a cloud communication connection; and
cause information transmission relating to the carrier aggregation configuration to at least one base station implementing at least one aggregated cell.

2. The apparatus of claim 1, wherein the at least one memory and the computer program code are further configured to, with the at least one processor, cause the apparatus to perform at least the following:
obtain decision information relating to the carrier aggregation configuration from the at least one base station implementing the at least one aggregated cell, the decision information comprising information on whether the at least one base station activates or deactivates an aggregated cell belonging to the carrier aggregation configuration; and
update the carrier aggregation configuration on the basis of the acquired information, and the received decision information.

3. The apparatus of claim 1 wherein the at least one memory and the computer program code are further configured to, with the at least one processor, cause the apparatus to perform at least the following:
obtain a carrier activation message from the at least one base station; and
cause data transmission to the at least one base station through the aggregated cell of the base station that transmitted the carrier activation message.

4. The apparatus of claim 1, wherein the at least one memory and the computer program code are further configured to, with the at least one processor, cause the apparatus to perform at least the following:
obtain a carrier deactivation message from the at least one base station;
update the carrier aggregation configuration on the basis of the acquired information, and the received carrier deactivation message; and
cause information transmission relating to the updated carrier aggregation configuration to at least one base station implementing at least one aggregated cell.

5. The apparatus of claim 1, wherein the same relevance of the aggregated cells implies that the radio resource control protocol connection of the apparatus is to any base station, or to all base stations, among the plurality of active base stations belonging to the carrier aggregation configuration.

6. The apparatus of claim 5, wherein the at least one memory and the computer program code are further configured to, with the at least one processor, cause the apparatus to perform at least the following:
select one aggregated cell from the carrier aggregation configuration as responsible for the radio resource control protocol connection; and
cause information transmission relating to radio resource control protocol connection to the selected responsible aggregated cell implemented by at least one base station.

7. The apparatus of claim 6, wherein the at least one memory and the computer program code are further configured to, with the at least one processor, cause the apparatus to perform at least the following:
obtain deactivation information from the base station implementing the selected responsible aggregated cell, the deactivation information comprising information on that the base station implementing the selected responsible aggregated cell deactivates the selected aggregated cell;
update the carrier aggregation configuration on the basis of the acquired information, and the received deactivation formation;
select another aggregated cell from the carrier aggregation configuration as responsible for the radio resource control protocol connection; and
cause information transmission relating to radio resource control protocol connection to the selected another responsible aggregated cell implemented by at least one base station.

8. A method performed by a terminal, comprising:
causing, by the terminal, information acquisition relating to a radio environment of the terminal;
creating, by the terminal, a carrier aggregation configuration of the terminal on the basis of the acquired information, the carrier aggregation configuration comprising a plurality of aggregated cells of same relevance implemented by at least one base station, wherein the plurality of aggregated cells form a cloud communication connection; and causing, by the terminal, information transmission relating to the carrier aggregation configuration to at least one base station implementing at least one aggregated cell.

9. The method of claim 8, further comprising:

obtaining decision information relating to the carrier aggregation configuration received by the terminal from the at least one base station implementing the at least one aggregated cell, the decision information comprising information on whether the at least one base station activates or deactivates an aggregated cell belonging to the carrier aggregation configuration; and updating the carrier aggregation configuration of the terminal on the basis of the acquired information, and the received decision information.

10. The method of claim 8 further comprising:

obtaining a carrier activation message received by the terminal from the at least one base station; and causing data transmission from the terminal to the at least one base station through the aggregated cell of the base station that transmitted the carrier activation message.

11. The method of claim 8, further comprising:

obtaining a carrier deactivation message received by the terminal from the at least one base station;

updating the carrier aggregation configuration of the terminal on the basis of the acquired information, and the received carrier deactivation message; and causing information transmission relating to the updated carrier aggregation configuration to at least one base station implementing at least one aggregated cell.

12. The method of any preceding claim 8, wherein the same relevance of the aggregated cells implies that the radio resource control protocol connection of the terminal is to any base station, or all base stations, among the plurality of active base stations belonging to the carrier aggregation configuration.

13. The method of claim 12, further comprising:

selecting one aggregated cell from the carrier aggregation configuration as responsible for the radio resource control protocol connection of the terminal; and causing information transmission relating to radio resource control protocol connection of the terminal to the selected responsible aggregated cell implemented by at least one base station.

14. The method of claim 13, further comprising:

obtaining deactivation information received by the terminal from the base station implementing the selected responsible aggregated cell, the deactivation information comprising information on that the base station implementing the selected responsible aggregated cell deactivates the selected aggregated cell;

updating the carrier aggregation configuration of the terminal on the basis of the acquired information, and the received deactivation formation;

selecting another aggregated cell from the carrier aggregation configuration as responsible for the radio resource control protocol connection of the terminal; and causing information transmission relating to radio resource control protocol connection of the terminal to the selected another responsible aggregated cell implemented by at least one base station.

15. A non-transitory computer-readable storage medium containing instructions which, when executed by at least one processor forming at least part of a computer system, cause the at least one processor to perform one or more operations comprising:

causing, by the at least one processor, information acquisition relating to a radio environment of a terminal;

creating, by the at least one processor, a carrier aggregation configuration of the terminal on the basis of the acquired information, the carrier aggregation configuration comprising a plurality of aggregated cells of same relevance implemented by at least one base station wherein the plurality of aggregated cells form a cloud communication connection; and causing, by the at least one processor, information transmission relating to the carrier aggregation configuration to at least one base station implementing at least one aggregated cell.

16. The non-transitory computer-readable storage medium program product according to claim 15 wherein the operations further comprise:

obtaining, by the at least one processor, decision information relating to the carrier aggregation configuration received by the terminal from the at least one base station implementing the at least one aggregated cell, the decision information comprising information on whether the at least one base station activates or deactivates an aggregated cell belonging to the carrier aggregation configuration; and updating, by the at least one processor, the carrier aggregation configuration of the terminal on the basis of the acquired information, and the received decision information.

17. The non-transitory computer-readable storage medium according to claim 15 wherein operations further comprise:

obtaining, by the at least one processor, a carrier activation message received by the terminal from the at least one base station; and causing, by the at least one processor, data transmission from the terminal to the at least one base station through the aggregated cell of the base station that transmitted the carrier activation message.

18. The non-transitory computer-readable storage medium according to claim 15 wherein the operations further comprise:

obtaining, by the at least one processor, a carrier deactivation message received by the terminal from the at least one base station;

updating, by the at least one processor, the carrier aggregation configuration of the terminal on the basis of the acquired information, and the received carrier deactivation message; and causing, by the at least one processor, information transmission relating to the updated carrier aggregation configuration to at least one base station implementing at least one aggregated cell.

19. The non-transitory computer-readable storage medium according to claim 15, wherein the same relevance of the aggregated cells implies that the radio resource control protocol connection of the terminal is to any base station, or all base stations, among the plurality of active base stations belonging to the carrier aggregation configuration.

20. The non-transitory computer-readable storage medium according to claim 19 wherein the operations further comprise:

selecting, by the at least one processor, one aggregated cell from the carrier aggregation configuration as responsible for the radio resource control protocol connection of the terminal; and causing, by the at least one processor, information transmission relating to radio resource control protocol connection of the terminal to the selected responsible aggregated cell implemented by at least one base station.

\* \* \* \* \*